(12) United States Patent
Endo

(10) Patent No.: US 8,159,624 B2
(45) Date of Patent: Apr. 17, 2012

(54) PROJECTOR

(75) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/096,237

(22) Filed: Apr. 28, 2011

(65) Prior Publication Data
US 2011/0279742 A1 Nov. 17, 2011

(30) Foreign Application Priority Data

May 13, 2010 (JP) .................................. 2010-110883
Mar. 18, 2011 (JP) .................................. 2011-060474

(51) Int. Cl.
*G02F 1/1335* (2006.01)

(52) U.S. Cl. ............. 349/8; 349/1; 349/2; 349/3; 349/4; 349/5

(58) Field of Classification Search .................. 349/1, 2, 349/3, 4, 5, 6, 7, 8, 9
See application file for complete search history.

(56) References Cited

U.S. PATENT DOCUMENTS

| | | | |
|---|---|---|---|
| 6,144,431 A | 11/2000 | Yamahara et al. | |
| 6,179,423 B1 | 1/2001 | Kato et al. | |
| 6,493,053 B1 | 12/2002 | Miyachi et al. | |
| 6,917,355 B1 * | 7/2005 | Fergason | 345/107 |
| 7,261,421 B2 * | 8/2007 | Yoshikawa et al. | 353/31 |
| 2003/0189692 A1 * | 10/2003 | Kawano et al. | 353/31 |
| 2004/0095535 A1 | 5/2004 | Nakagawa | |
| 2005/0168662 A1 | 8/2005 | Nakagawa | |
| 2006/0268207 A1 | 11/2006 | Tan et al. | |
| 2006/0285042 A1 | 12/2006 | Chen et al. | |
| 2007/0258029 A1 | 11/2007 | Nakagawa et al. | |
| 2008/0117385 A1 | 5/2008 | Endo | |
| 2008/0266470 A1 | 10/2008 | Muramoto | |
| 2009/0067049 A1 | 3/2009 | Nakagawa et al. | |

FOREIGN PATENT DOCUMENTS

| | | |
|---|---|---|
| JP | A-10-123503 | 5/1998 |
| JP | A-11-242221 | 9/1999 |
| JP | A-2001-117099 | 4/2001 |
| JP | A-2001-147450 | 5/2001 |
| JP | A-2004-102200 | 4/2004 |
| JP | A-2004-163450 | 6/2004 |
| JP | A-2004-170712 | 6/2004 |
| JP | A-2006-171327 | 6/2006 |
| JP | A-2006-323283 | 11/2006 |
| JP | A-2007-4144 | 1/2007 |
| JP | A-2008-70666 | 3/2007 |
| JP | A-2007-233208 | 9/2007 |
| JP | WO2007/105371 A1 | 9/2007 |

(Continued)

*Primary Examiner* — Jennifer Doan

(74) *Attorney, Agent, or Firm* — Oliff & Berridge, PLC

(57) ABSTRACT

A projector capable of increasing in the contrast by reducing the amount of leakage of light due to reflection of light on the surface of a retarder is to be provided. A retarder is placed and tilted in a direction so that the following conditional expression is satisfied, denoting a distance between a point A where the normal drawn from the center of a substrate plane of the retarder and a substrate plane of a polarizing beam splitter intersect and a point C where the substrate plane of the polarizing beam splitter and the optical axis of a projection system as AC, and a distance between a point B where the substrate plane of the polarizing beam splitter and the system optical axis intersect and the point C as BC: AC>BC.

4 Claims, 6 Drawing Sheets

FOREIGN PATENT DOCUMENTS

| | | |
|---|---|---|
| JP | A-2009-505141 | 2/2009 |
| JP | A-2009-63846 | 3/2009 |
| JP | A-2009-210750 | 9/2009 |
| JP | A-2009-229804 | 10/2009 |

* cited by examiner

PROJECTOR

BACKGROUND

1. Technical Field

The present invention relates to a projector which projects, as an image, a luminous flux modulated by a light modulating device.

2. Related Art

There is a technique of compensating for the viewing angle of a reflective liquid crystal panel by placing an optical element at an angle, the optical element placed between a polarizing beam splitter and the reflective liquid crystal panel, in a projector using the reflective liquid crystal panel and thereby increasing the contrast.

It is explicitly stated that, in a projector disclosed in JP-A-2007-4144, there are a plurality of directions of tilt which are most suitable for increasing the contrast by tilting an optical element, but the light reflected from the surface of the optical element or the relation with a projection system is not described. When the contrast is so high that reflection on the surface of the optical element cannot be ignored, the contrast sometimes cannot be increased to the fullest extent by the direction of tilt.

SUMMARY

An advantage of some aspects of the invention is to solve at least part of the problems described above, and the invention can be realized as an embodiment or an application example described below.

A projector according to an aspect of the invention includes an illumination system emitting an illuminating light having a system optical axis as a central axis thereof; a polarizing beam splitter allowing a light from the illumination system to pass therethrough and reflecting the light; a reflective liquid crystal panel modulating, according to an image signal, the light which has passed through the polarizing beam splitter; a retarder placed between the reflective liquid crystal panel and the polarizing beam splitter; and a projection system projecting the light reflected from the polarizing beam splitter, wherein the projection system has an optical axis which does not coincide with the system optical axis and is parallel to the system optical axis, the polarizing beam splitter is placed in such a way that a normal direction of a substrate plane of the polarizing beam splitter and the system optical axis form an angle of about 45 degrees, and, the retarder is placed and tilted in a direction in which the following conditional expression is satisfied, denoting a point where the normal drawn from the center of a substrate plane of the retarder and the substrate plane of the polarizing beam splitter intersect as A, a point where the substrate plane of the polarizing beam splitter and the system optical axis intersect as B, a point where the substrate plane of the polarizing beam splitter and the optical axis of the projection system intersect as C, a distance between the point A and the point C as AC, and a distance between the point B and the point C as BC:

$$AC > BC \tag{2}$$

According to the aspect of the invention, since the retarder is tilted in such a way that the distance BC is smaller than the distance AC, the light reflected from the surface of the retarder travels so as to move away from the optical axis of the projection system. This makes the light reflected on the surface of the retarder unlikely to enter the projection system, and thereby makes it possible to reduce the amount of light which passes through the projection system when black is displayed by the reflective liquid crystal panel. That is, it is possible to increase the contrast which is expressed as the ratio between the amount of light projected when a white image is displayed and the amount of light projected when a black image is displayed.

In the projector according to the aspect of the invention, the retarder is placed and tilted so that the following conditional expression is satisfied, denoting an angle of tilt of a luminous flux incidence plane of the retarder with respect to a virtual plane (a yz-plane) perpendicular to the system optical axis as θ, a radius of a lens of the projection system as d, a shift distance between the lens optical axis of the projection system and the system optical axis as s, a lens back focus of the projection system as L, a distance between the reflective liquid crystal panel and the retarder as f, and a F number of the lens of the projection system as Fno:

$$(L-f)^*\tan(2\theta) > d-s \tag{1}$$

According to this configuration, since the tilted placement of the retarder is set so that expression (1) above is satisfied, the direction of tilt of the retarder can be set in such a way that the light reflected from the surface of the retarder travels so as to move away from the optical axis of the projection system. Therefore, it is possible to increase the contrast which is expressed as the ratio between the amount of light projected when a white image is displayed and the amount of light projected when a black image is displayed.

In the projector according to the aspect of the invention, it is preferable that the retarder be a retarder having a retardation characteristic which compensates for the retardation characteristic of the reflective liquid crystal panel in a state in which no voltage is applied, and, the retarder satisfies the following conditional expression, denoting an indexes of refraction in a plane of the retarder as nx and ny and an index of refraction in a thickness direction of the retarder as nz:

$$ny \approx nx > nz \tag{4}$$

According to this configuration, by tilting the retarder, it is possible to compensate for the viewing angle of the liquid crystal, and, in principle, there are two directions of tilt which can be compensated for. In this case, by selecting the direction in which the above-described reflected light is unlikely to enter the projection system, it is possible to increase the contrast to the fullest extent.

In the projector according to the aspect of the invention, it is preferable that the retarder be a structural birefringent retarder formed of multilayered inorganic substances.

According to this configuration, since the retarder can be formed of inorganic substances, it is possible to increase the reliability of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
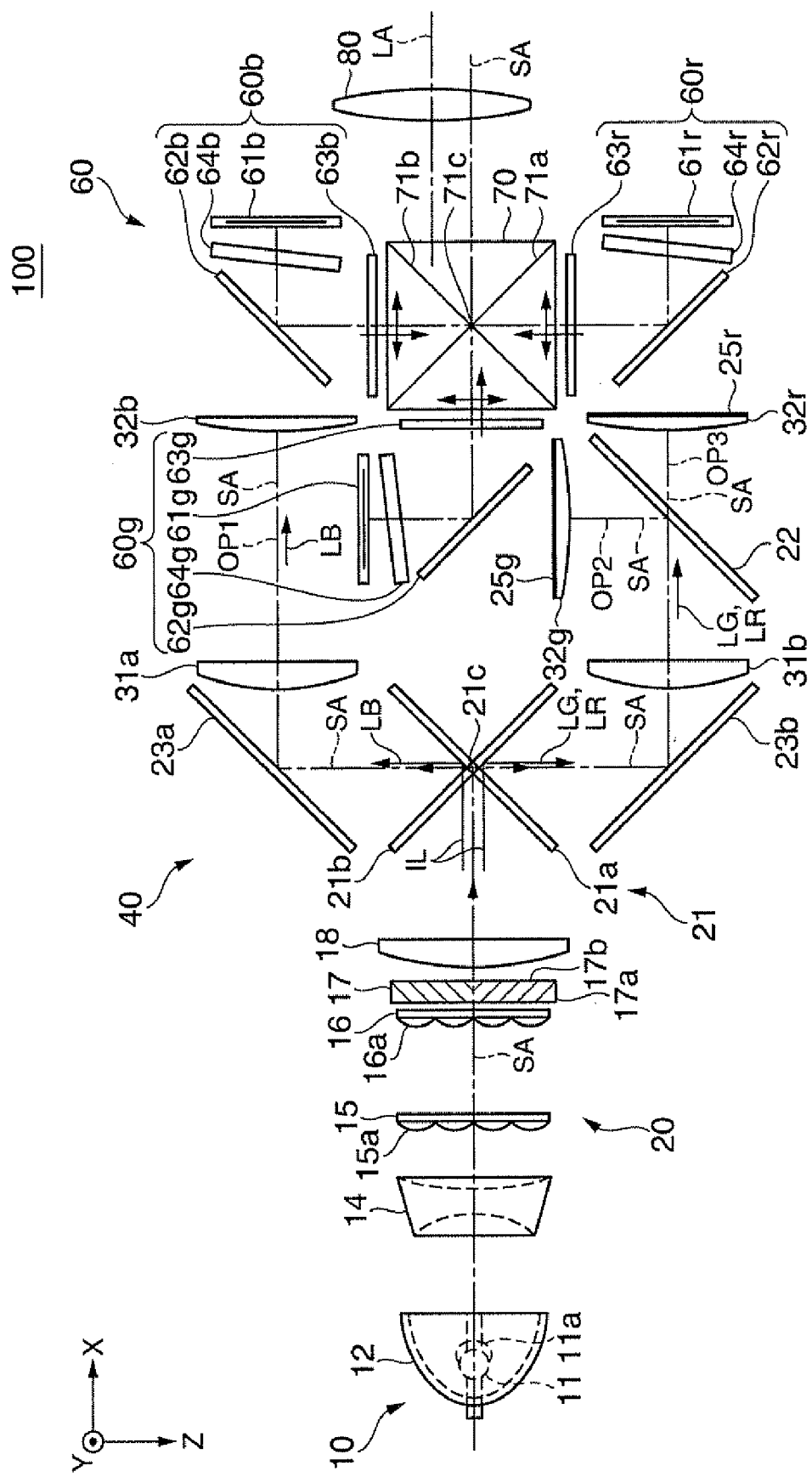
FIG. 1 is a diagram explaining the configuration of an optical system of a projector according to a first embodiment.

Hereinafter, the configuration of an optical system of a projector according to a first embodiment of the invention will be described with reference to FIG. 1. Incidentally, in FIG. 1, X, Y, and Z mean three coordinate axes forming a three-dimensional rectangular coordinate system.

A projector 100 shown in the drawing includes an illumination system 20 which emits an illuminating light, a color separation light guiding system 40 which separates the illuminating light from the illumination system 20 into three colored lights: a blue (b)-colored light, a green (g)-colored light, and a red (r)-colored light, a light modulating section 60 which modulates the three colored lights exiting from the color separation light guiding system 40 according to image information, a light combining section 70 which combines the image lights of these colors exiting from the light modulating section 60, and a projection system 80 which projects the image light obtained by the light combining section 70 onto a screen (not shown). Of these component elements, the illumination system 20, the color separation light guiding system 40, the light modulating section 60, and the light combining section 70 are housed in a housing (not shown) for optical components. Incidentally, in the projector 100, a system optical axis SA corresponding to a central axis of a luminous flux from the illumination system 20 to the light combining section 70 is two-dimensionally placed parallel to an XZ-plane (a reference plane).

In the projector 100, the illumination system 20 includes a light source device 10, a concave lens 14, a first lens array 15, a second lens array 16, a polarization converting device 17, and a superimposing lens 18. Of these component elements, the light source device 10 is a light source for emitting a luminous flux for illumination and includes, for example, a luminous tube 11 which is a high-pressure mercury lamp or the like, a secondary mirror 11a which makes the luminous flux exiting from the luminous tube 11 toward the front where the superimposing lens 18 or the like is present return to the luminous tube 11, and a concave mirror 12 which collects the luminous flux exiting from the luminous tube 11 backward and makes the luminous flux exit toward the front.

The concave lens 14 collimates the luminous flux from the light source device 10. However, for example, when the concave mirror 12 is a parabolic mirror, the concave lens 14 can be omitted.

The first lens array 15 is formed of a plurality of element lenses 15a arranged in a matrix, and splits the luminous flux exiting from the concave lens 14 into parts corresponding to the element lenses 15a. The second lens array 16 is formed of a plurality of element lenses 16a arranged so as to correspond to the plurality of element lenses 15a, and adjusts the divergent state of the split luminous fluxes from the element lenses 15a.

The polarization converting device 17 is a polarization converting section which converts the split luminous fluxes exiting from the second lens array 16 into only linear polarization having a polarization plane parallel to a first direction (in this embodiment, the Z direction) and supplies the linear polarization to the next-stage optical system.

The superimposing lens 18 makes an illuminating light IL as the linear polarization obtained by the passage through the polarization converting device 17 appropriately converge as a whole, and thereby makes it possible to perform superposition illumination for liquid crystal light valves 60b, 60g, and 60r of blue, green, and red provided in an illuminated region, that is, the light modulating section 60.

In other words, the illuminating light IL which has passed through the lens arrays 15 and 16 and the superimposing lens 18 passes through the color separation light guiding system 40, which will be described later in detail, and evenly illuminates the reflective liquid crystal panels 61b, 61g, and 61r of blue, green, and red by superposition illumination, the reflective liquid crystal panels 61b, 61g, and 61r provided in the light modulating section 60.

The polarization converting device 17 includes a plurality of prism elements 17a each having a structure into which a polarizing beam splitter (PBS) and a mirror are incorporated and a plurality of wave plates 17b which are attached on one light exit surfaces of these prism elements 17a. Each prism element 17a is a rod-like member extending in the Y direction, and these prism elements 17a are arranged in the Z direction and are placed as a whole in the form of a plate extending parallel to a YZ-plane. As described above, the illuminating light IL which is the linear polarization in the first direction is made to exit from the polarization converting device 17. Here, the first direction is the direction of the polarization plane or the direction of vibration of an electric field when the optical path of the projector 100 is developed linearly, and the linear polarization in the first direction can be switched to a state parallel to a second direction which is a 90 degree rotated first direction as a result of the passage through the reflective liquid crystal panels 61b, 61g, and 61r.

The color separation light guiding system 40 includes a cross dichroic mirror 21, a dichroic mirror 22, bending mirrors 23a and 23b, first lenses 31a and 31b, and second lenses 32b, 32g, and 32r. Here, the cross dichroic mirror 21 includes, as a pair of separation planes, a first dichroic mirror 21a and a second dichroic mirror 21b. The first dichroic mirror 21a and the second dichroic mirror 21b intersect at right angles, and an intersecting axis 21c of these mirrors extends in the Y direction.

The first dichroic mirror 21a reflects blue (B), for example, as one color component contained in the illuminating light IL, and allows green (G) and red (R) to pass therethrough as other color components. The second dichroic mirror 21b reflects green (G) and red (R) which are the other color components and allows blue (B), which is the one color component, to pass therethrough. The dichroic mirror 22 reflects green (G), for example, as one of green and red (GR) which are the two color components that have entered the dichroic mirror 22, and allows red (R) to pass therethrough as the other of the two colors.

As a result, a blue light LB, a green light LG, and a red light LR which form the illuminating light IL exiting from the illumination system 20 are guided to a first optical path OP1, a second optical path OP2, and a third optical path OP3, respectively, and enter different objects to be illuminated.

Specifically, the illuminating light IL from the illumination system 20 enters the cross dichroic mirror 21. The blue light LB split as a result of being reflected from the first dichroic mirror 21a of the cross dichroic mirror 21 passes through the bending mirror 23a and the like and then enters a polarizing beam splitter 62b of the liquid crystal light valve 60b.

Moreover, the green light LG which has been split as a result of being reflected from the second dichroic mirror 21b of the cross dichroic mirror 21, passed through the bending mirror 23b and the like, and then split as a result of being reflected from the dichroic mirror 22 enters a polarizing beam splitter 62g of the liquid crystal light valve 60g. Furthermore, the red light LR which has been split as a result of being reflected from the second dichroic mirror 21b of the cross dichroic mirror 21 and split by the passage through the dichroic mirror 22 enters a polarizing beam splitter 62r of the liquid crystal light valve 60r.

Incidentally, the first lens 31a and the second lens 32b which are placed on the first optical path OP1 are provided for adjusting the angle state of the blue light LB which enters the reflective liquid crystal panel 61b. Moreover, the first lens 31b and the second lens 32g which are placed on the second optical path OP2 are provided for adjusting the angle state of the green light LG which enters the reflective liquid crystal panel 61g. The first lens 31b and the second lens 32r which are placed on the third optical path OP3 are provided for adjusting the angle state of the red light LR which enters the reflective liquid crystal panel 61r. Here, color filters 25g and 25r attached to the second lenses 32g and 32r are not indispensable, but are provided for adjusting the brightness balance of the green light LG and the red light LR which enter the reflective liquid crystal panels 61g and 61r, respectively.

The light modulating section 60 includes the three liquid crystal light valves 60b, 60g, and 60r for the first optical path OP1, the second optical path OP2, and the third optical path OP3, respectively, which are three optical paths for the three colors described above. The liquid crystal light valves 60b, 60g, and 60r are non-luminous light modulating devices which modulate the space distribution of the intensity of the illuminating light which has entered the liquid crystal light valves 60b, 60g, and 60r.

Figure 2:
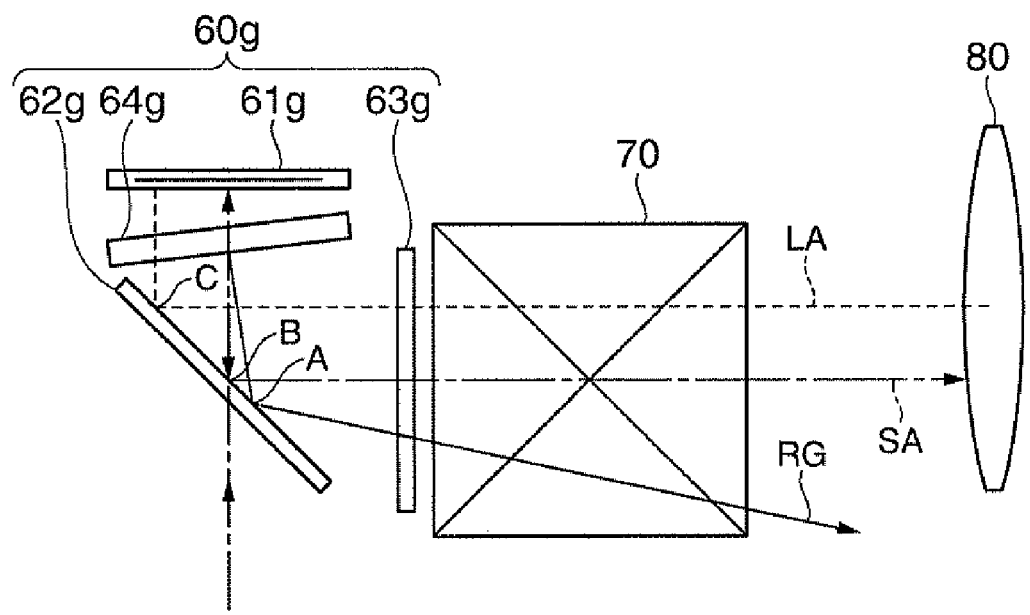
FIG. 2 is an enlarged view of a liquid crystal light valve for a G optical path, the enlarged view explaining a light modulating device of the projector shown in FIG. 1.

The liquid crystal light valve 60g for color G will be described by using FIG. 2 in addition to FIG. 1 which has been described above. FIG. 2 is an enlarged view of the liquid crystal light valve for color G (for a G optical path) functioning as the light modulating device.

The liquid crystal light valve 60g for color G includes the reflective liquid crystal panel 61g which is illuminated with the green light LG, the polarizing beam splitter 62g which is placed on the light entering/exiting-side of the reflective liquid crystal panel 61g, a retarder 64g which is placed between the reflective liquid crystal panel 61g and the polarizing beam splitter 62g, and a polarization element 63g which is placed on the light exiting-side of the liquid crystal light valve 60g.

Though not shown in the drawing, the reflective liquid crystal panel 61g includes a light-transmissive substrate having a transparent electrode and the like, a driving substrate having a reflecting pixel electrode and the like, and a liquid crystal layer sealed in between the light-transmissive substrate and the driving substrate.

The polarizing beam splitter 62g is a structural birefringent polarization separation element, specifically, a wire grid polarizing plate which is formed of a light transmissive body flat plate on which a grid of electrical conducting material is formed in the form of stripes. The polarizing beam splitter 62g is tilted as a result of the substrate plane thereof being rotated about 45 degrees about the Y-axis from a state in which the substrate plane is perpendicular to the system optical axis SA. That is, the normal of the substrate plane of the polarizing beam splitter 62g is tilted about 45 degrees with respect to the system optical axis SA. The polarizing beam splitter 62g guides the green light LG which has entered the polarizing beam splitter 62g to the reflective liquid crystal panel 61g by selectively allowing the linear polarization in the above-described first direction (in this case, the Z direction) to pass therethrough.

The reflective liquid crystal panel 61g converts, according to an image signal, the polarization state of the green light LG which has entered the reflective liquid crystal panel 61g into linear polarization in a second direction (in this case, the Y direction) which is partially perpendicular to the first direction, and reflects the light toward the polarizing beam splitter 62g. Of the lights modulated by the passage through the reflective liquid crystal panel 61g, the polarizing beam splitter 62g selectively reflects only a linear polarization component in the second direction (in this case, the Y direction). At this time, by providing the retarder 64g between the polarizing beam splitter 62g and the reflective liquid crystal panel 61g, it is possible to compensate for a phase shift caused by pretilt or the like of the liquid crystal layer of the reflective liquid crystal panel 61g and increase the degree of polarization or the extinction ratio on the light-exiting side of the polarizing beam splitter 62g. This makes it possible to make the contrast of the liquid crystal light valve 60g higher.

As mentioned above, the retarder 64g is an element for modulating the polarization state of the light to compensate for a phase shift caused by pretilt or the like of the liquid crystal layer of the reflective liquid crystal panel 61g, and the retarder 64g is placed in such a way that the substrate plane thereof is tilted a predetermined angle with respect to the system optical axis SA. The details of the tilted placement of the retarder 64g will be described later.

Figure 4:
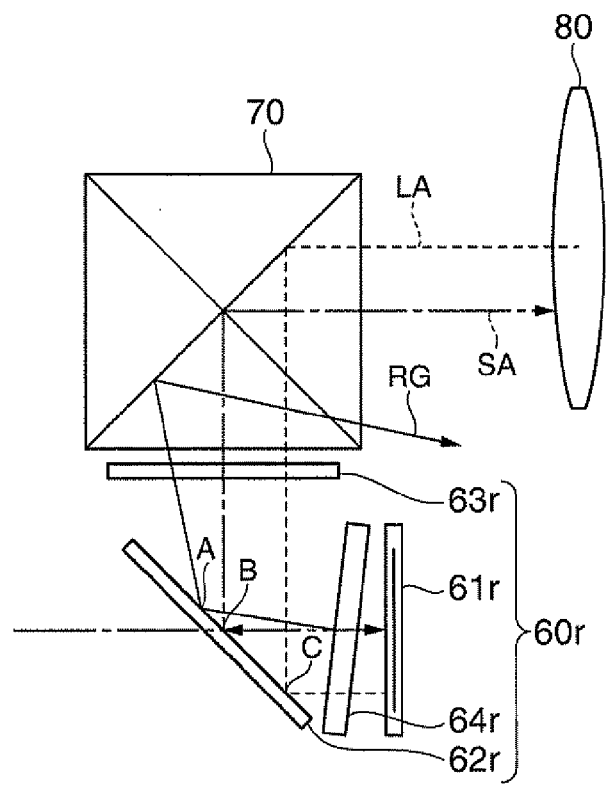
FIG. 4 is an enlarged view of a liquid crystal light valve for an R optical path forming the projector of FIG. 1.

The liquid crystal light valve 60r for color R will be described by using FIG. 4. FIG. 4 is an enlarged view of the liquid crystal light valve for color R (an R optical path) functioning as the light modulating device.

The liquid crystal light valve 60r for color R includes the reflective liquid crystal panel 61r which is illuminated with the red light LR, the polarizing beam splitter 62r which is placed on the light entering/exiting-side of the reflective liquid crystal panel 61r, a retarder 64r which is placed between the reflective liquid crystal panel 61r and the polarizing beam splitter 62r, and a polarization element 63r which is placed on the light exiting-side of the liquid crystal light valve 60r. Incidentally, the component elements of the liquid crystal light valve 60r for color R correspond to the component elements of the liquid crystal light valve 60g for color G, and the structure and operation thereof are the same as those of the component elements of the liquid crystal light valve 60g for color G. Therefore, the detailed description of these component elements is omitted.

Figure 5:
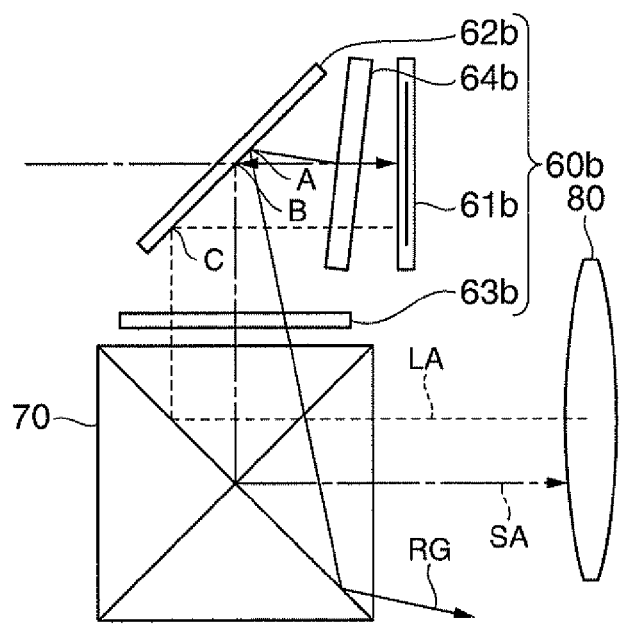
FIG. 5 is an enlarged view of a liquid crystal light valve for a B optical path forming the projector of FIG. 1.

The liquid crystal light valve 60b for color B will be described by using FIG. 5. FIG. 5 is an enlarged view of the liquid crystal light valve for color B (a B optical path) functioning as the light modulating device.

The liquid crystal light valve 60b for color B includes the reflective liquid crystal panel 61b which is illuminated with the blue light LB, the polarizing beam splitter 62b which is placed on the light entering/exiting-side of the reflective liquid crystal panel 61b, a retarder 64b which is placed between the reflective liquid crystal panel 61b and the polarizing beam splitter 62b, and a polarization element 63b which is placed on the light exiting-side of the liquid crystal light valve 60b. Incidentally, the component elements of the liquid crystal light valve 60b for color B correspond to the component elements of the liquid crystal light valve 60g for color G, and the structure and operation thereof are the same as those of the component elements of the liquid crystal light valve 60g for color G. Therefore, the detailed description of these component elements is omitted.

The description will be given with reference to FIG. 1. The light combining section 70 is formed of four right-angle prisms bonded together and has a virtually square shape as seen in a plan view. At the interface at which the right-angle prisms are bonded together, a pair of first dichroic mirror 71a and a second dichroic mirror 71b which cross each other in the shape of the letter X and have an intersecting axis 71c extending in the Y direction is formed as a combined plane. The dichroic mirrors 71a and 71b are each formed of a dielectric multilayer, and the characteristics of the dielectric multilayer forming the dichroic mirror 71a are different from those of the dielectric multilayer forming the dichroic mirror 71b. That is, the first dichroic mirror 71a reflects the blue light LB, and the second dichroic mirror 71b reflects the red light LR.

The light combining section 70 makes the modulated green light LG from the liquid crystal light valve 60g travel in a straight line in the X direction by making the green light LG pass through the first and second dichroic mirrors 71a and 71b, makes the modulated red light LR from the liquid crystal light valve 60r exit in the X direction by reflecting the red light LR by the second dichroic mirror 71b and bending the optical path, and makes the modulated blue light LB from the liquid crystal light valve 60b exit in the X direction by reflecting the blue light LB by the first dichroic mirror 71a and bending the optical path. On the light exiting-side of the light combining section 70, the colored lights: the green light LG, the blue light LB, and the red light LR are superimposed and combined. Incidentally, a ½ wave plate (not shown) is placed between the light combining section 70 and the polarization element 63g for color G. In this case, it is possible to make the green light LG enter the first and second dichroic mirrors 71a and 71b in a P polarization state. This makes it possible to enhance combining efficiencies of the colored lights: the blue light LB, the green light LG, and the red light LR in the light combining section 70 and prevent the occurrence of unevenness of color.

The projection system 80 projects the color image light obtained by the light combining section 70 onto a screen (not shown) at an intended magnification. That is, color moving images or color still images rescaled at an intended magnification, the color moving images or color still images corresponding to the drive signal or image signal input to the reflective liquid crystal panels 61b, 61g, and 61r, are projected onto the screen. The optical axis LA of the projection system 80 does not coincide with the system optical axis SA, and is a predetermined distance away from the system optical axis SA in the −z direction and parallel to the system optical axis SA. Therefore, the projector 100 can project a projection image by making a center of the projection image away from the system optical axis in the −z direction.

Next, the tilted placement of the retarder 64g will be described in detail by using FIG. 2. Let a point where the normal drawn from the center of the substrate plane of the retarder 64g and the substrate plane of the polarizing beam splitter 62g intersect be A, a point where the substrate plane of the polarizing beam splitter 62g and the system optical axis SA intersect be B, and a point where the substrate plane of the polarizing beam splitter 62g and the optical axis LA of the projection system 80 intersect be C. Then, the retarder 64g is placed and tilted in such a way that the distance AC between the point A and the point C and the distance BC between the point B and the point C satisfy expression (2) below.

$$AC>BC \tag{2}$$

A reflected light RG of the green light LG, the reflected light RG which has been reflected from the surface of the retarder 64g, will be described. The reflected light RG travels so as to move away from the optical axis LA of the projection system 80 and is less likely to enter the projection system 80. That is, it is possible to reduce the amount of leakage of light at the time of black display and increase the contrast of the liquid crystal light valve 60g.

Figure 3:
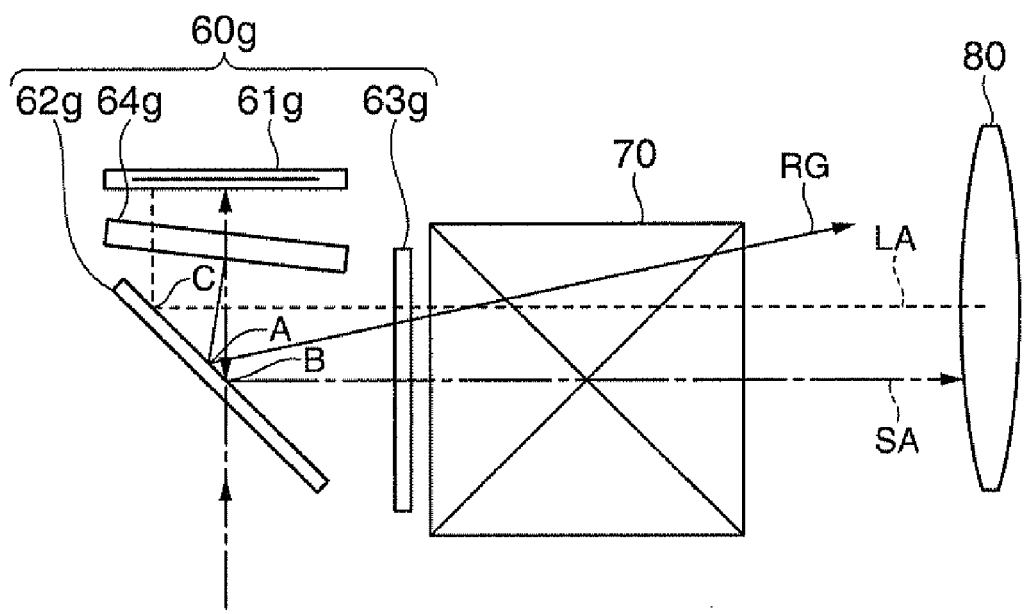
FIG. 3 is a comparative example of FIG. 2 and is an enlarged view of the liquid crystal light valve for the G optical path.

FIG. 3 shows the liquid crystal light valve 60g, the light combining section 70, and the projection system 80 as a comparative example. In this case, it is assumed that the retarder 64g is placed and tilted in such a way that the distance AC between the point A and the point C and the distance BC between the point B and the point C satisfy expression (3) below.

$$AC<BC \tag{3}$$

A reflected light RG of the green light LG, the reflected light RG which has been reflected from the surface of the retarder 64g, will be described. The reflected light RG travels so as to move closer to the optical axis LA of the projection system 80 and is likely to enter the projection system 80. That is, the amount of leakage of light at the time of black display is increased, and the contrast of the liquid crystal light valve 60g is reduced.

FIG. 4 shows the liquid crystal light valve 60r, the light combining section 70, and the projection system 80. Also in this case, as is the case with the liquid crystal light valve 60g (see FIG. 2) of this embodiment, the retarder 64r is placed and tilted so as to satisfy expression (2) above. Doing so makes it possible to reduce the amount of leakage of light at the time of black display and thereby increase the contrast of the liquid crystal light valve 60r.

FIG. 5 shows the liquid crystal light valve 60b, the light combining section 70, and the projection system 80. Also in this case, as is the case with the liquid crystal light valve 60g (see FIG. 2) of this embodiment, the retarder 64b is placed and tilted so as to satisfy expression (2) above. Doing so makes it possible to reduce the amount of leakage of light at the time of black display and thereby increase the contrast of the liquid crystal light valve 60b.

By placing and tilting the retarders 64b and 64r so as to satisfy expression (2) above as is the case with the retarder 64g of this embodiment, the contrast of the liquid crystal light valves 60b and 60r can also be increased.

As is clear from the above description, the projector 100 of this embodiment includes the illumination system 20 which emits the illuminating light IL having the system optical axis SA as the central axis thereof, the polarizing beam splitters 62b, 62g, and 62r which are in the form of a substrate (a flat plate), the polarizing beam splitters 62b, 62g, and 62r which allow, of the lights emitted from the illumination system 20, the light traveling in a predetermined polarization direction to pass therethrough and reflect the light in a polarization direction perpendicular to the predetermined polarization direction, the reflective liquid crystal panels 61b, 61g, and 61r which modulate the light emitted from the illumination system 20 according to the image signal, the retarders 64b, 64g, and 64r which are placed between the reflective liquid crystal panels 61b, 61g, and 61r and the polarizing beam splitters 62b, 62g, and 62r, respectively, and the projection system 80 which projects the lights reflected from the polarizing beam splitters 62b, 62g, and 62r.

Furthermore, in this embodiment, the optical axis LA of the projection system 80 and the system optical axis SA do not coincide with each other and are parallel to one another, and the polarizing beam splitters 62b, 62g, and 62r are placed in such a way that the normal directions of the substrate planes thereof form an angle of about 45 degrees with the system optical axis SA. When points where the normals drawn from the centers of the substrate planes of the retarders 64b, 64g, and 64r and the substrate planes of the polarizing beam splitters 62b, 62g, and 62r intersect, respectively, are assumed to be A, points where the substrate planes of the polarizing beam splitters 62b, 62g, and 62r and the system optical axis SA intersect are assumed to be B, and points where the substrate planes of the polarizing beam splitters 62b, 62g, and 62r and the optical axis LA of the projection system 80 intersect are assumed to be C, the retarders 64b, 64g, and 64r are placed and tilted in a direction in which the distance AC between the point A and the point C and the distance BC between the point B and the point C satisfy the relational expression AC>BC. Since the projector 100 of this embodiment is configured as described above, it is possible to reduce the amount of light at the time of display of a black image and increase the contrast.

Figure 6:
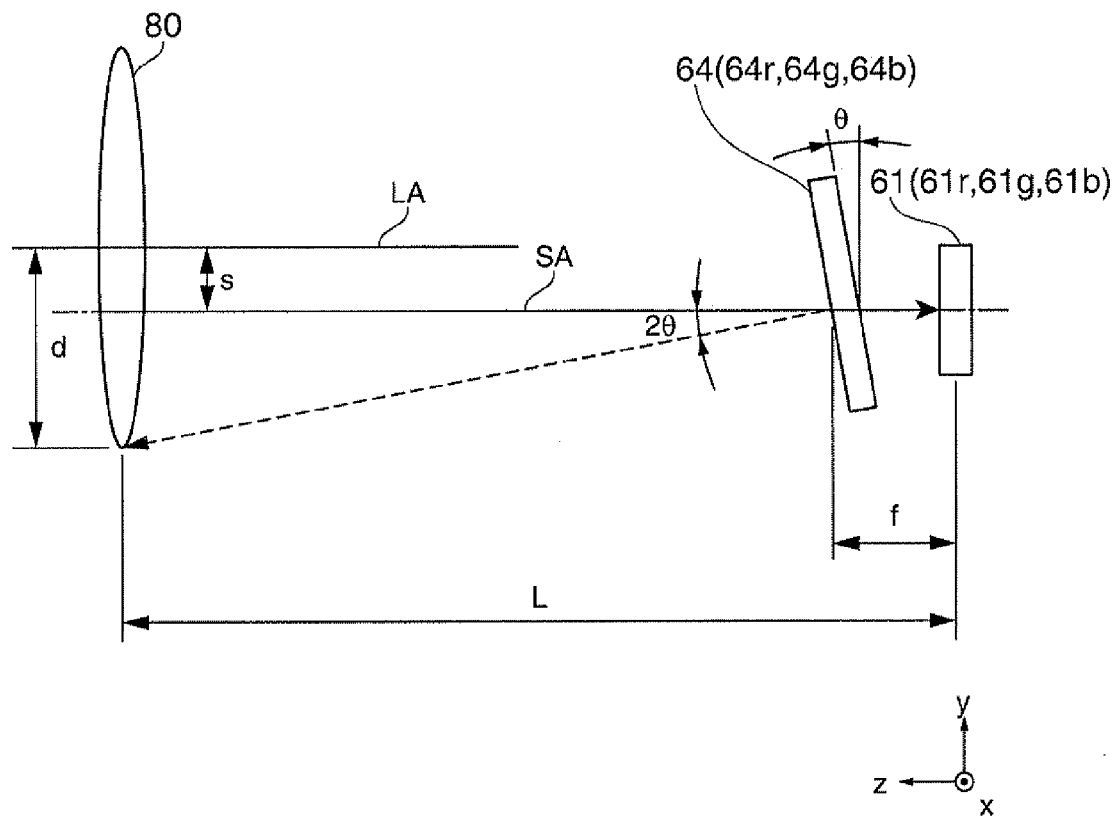
FIG. 6 is a schematic diagram linearly showing the B optical path in this embodiment.

FIG. 6 is a schematic diagram showing an optical path between the retarder 64b (64g, 64r) and the projection system 80. Although the optical path actually bends via the polarizing beam splitter 62b (62g, 62r), it is depicted in FIG. 6 as an optical path which is linearly developed. In FIG. 6, x, y, and z mean three coordinate axes forming a three-dimensional rectangular coordinate system, and a z-axis is parallel to the system optical axis SA. Moreover, in FIG. 6, the optical path of blue (B) is shown as an example; however, the same goes for the optical path of green (G) and the optical path of red (R).

Here, let the radius of a lens of the projection system 80 be d, the distance between the lens optical axis of the projection system 80 and the system optical axis SA be s, the lens back focus of the projection system 80 be L, the distance between the reflective liquid crystal panel 61b (61g, 61r) and the retarder 64b (64g, 64r) be f, and the F number of the lens of the projection system 80 be Fno. Then, the angle θ of tilt of the luminous flux incidence plane and the luminous flux exit plane of the retarder 64b (64g, 64r) with respect to a virtual plane (a yz-plane) perpendicular to the system optical axis SA (a z-axis) is set so as to satisfy expression (1) below.

$$(L-f)*\tan(2\theta) > d-s \quad (1)$$

The angle of tilt of the retarder 64b (64g, 64r) with respect to the system optical axis SA is nearly equal to the angle of pretilt of the liquid crystal layer of the corresponding reflective liquid crystal panel 61b (61g, 61r) (the angle of tilt of the main axis of a liquid crystal molecule with respect to the system optical axis SA). The retarder 64b (64g, 64r) is a plate-like member with the luminous flux incidence plane and the luminous flux exit plane which are parallel to each other, the plate-like member having birefringent properties, and the main axis of the birefringence ellipsoid thereof is nearly perpendicular to the luminous flux incidence plane.

The relationship between the indexes of refraction of the reflective liquid crystal panel and the retarder will be described by using FIGS. 7A to 7D by taking up the liquid crystal light valve 60g as an example. FIGS. 7A to 7D are conceptual diagrams showing the relationship between the indexes of refraction of the reflective liquid crystal panel 61g and the retarder 64g of the projector 100 according to this embodiment.

The reflective liquid crystal panel 61g includes a liquid crystal layer 61c and a mirror 61d. Moreover, the liquid crystal layer 61c contains a liquid-crystalline compound 65.

Here, the liquid-crystalline compound 65 of the liquid crystal layer 61c has positive uniaxial properties, and, as shown in FIGS. 7A to 7D, the birefringence characteristics thereof are expressed as an oval index ellipsoid. The liquid-crystalline compound 65 is oriented in a direction in which (at an angle at which) the optical axis is slightly tilted with respect to the X-axis. By orienting the liquid-crystalline compound 65 at an angle at which the optical axis is slightly tilted with respect to the X-axis, the liquid crystal light valve 60g can ensure a maximum transmission state in an on state in which the voltage is applied to the liquid crystal layer 61c. Furthermore, when the index of refraction in the normal direction of the substrate surface is assumed to be nz and the indexes of refraction in the substrate surface are assumed to be ny and nx, the retarder 64g has, negative uniaxial properties expressed by expression (4) below, and the birefringent characteristics thereof are expressed as a disk-shaped index ellipsoid as shown in FIGS. 7A to 7D.

$$ny \approx nx > nz \quad (4)$$

Figure 7A:
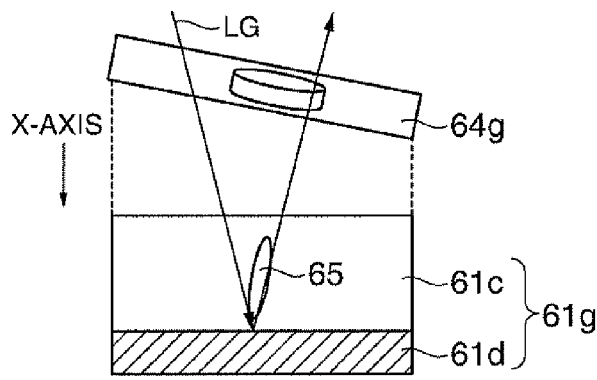
FIGS. 7A to 7D are conceptual diagrams of an index ellipsoid of the liquid crystal light valve for the G optical path forming the projector of FIG. 1.

FIG. 7A shows a case in which the retarder 64g is placed and tilted in such a way that the optical axis thereof is tilted in the same direction as the direction in which the optical axis of the liquid-crystalline compound 65 is slightly tilted. The green light LG passes through the retarder 64g and the liquid crystal layer 61c, is reflected from the mirror 61d in the reflective liquid crystal panel 61g, and, after being reflected therefrom, passes through the liquid crystal layer 61c and the retarder 64g again.

Figure 7B:
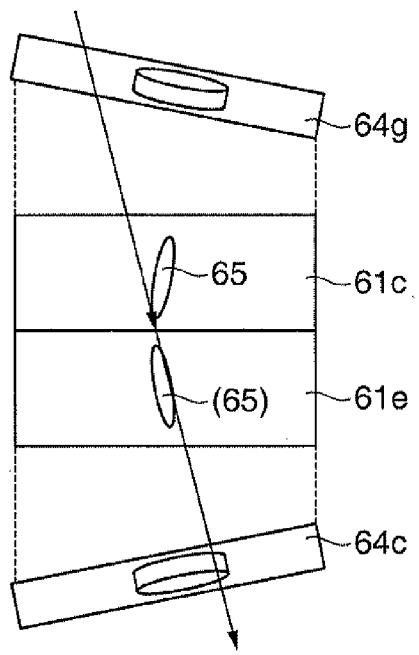

FIG. 7B shows FIG. 7A schematically expressed as a transmission type. A liquid crystal layer 61e is a liquid crystal layer corresponding to the liquid crystal layer 61c through which the green light LG passes after being reflected from the mirror 61d, and a retarder 64c is a retarder corresponding to the retarder 64g through which the green light LG passes after being reflected from the mirror 61d. Since the positive and negative uniaxial birefringent materials with the same optical axis direction cancel out each other's influences, the influences of the liquid crystal layer 61c and the retarder 64g are cancelled out, and the influences of the liquid crystal layer 61e and the retarder 64c are cancelled out. This reduces the influence of birefringence caused by pretilt of the liquid crystal layer 61c on the green light LG in black display in which no voltage is applied to the reflective liquid crystal panel 61g, and thereby reduces the amount of light of black. This eventually makes it possible to increase the contrast of the liquid crystal light valve 60g.

Figure 7C:
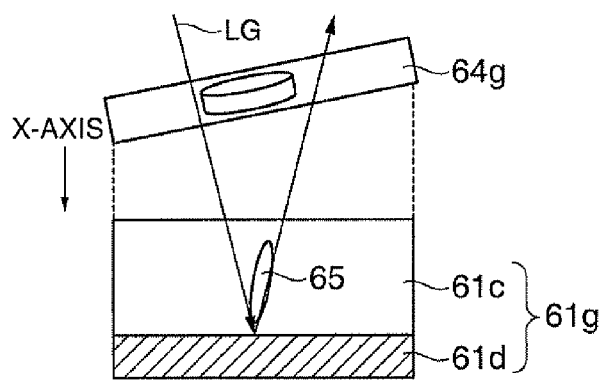
Figure 7D:
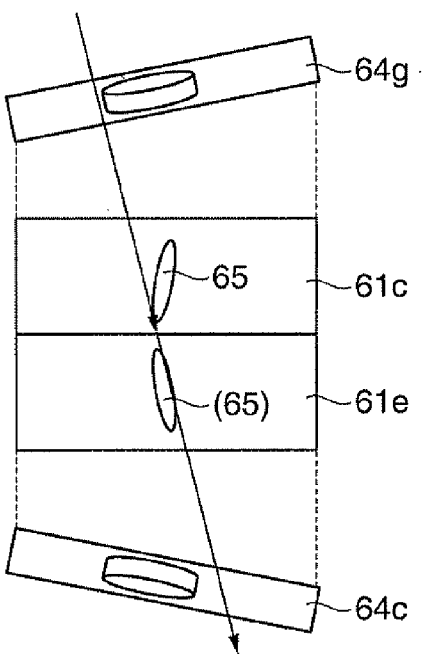

FIGS. 7C and 7D show a case in which the retarder 64g is placed and tilted in such a way that the optical axis thereof is tilted in a direction opposite to the direction in which the optical axis of the liquid-crystalline compound 65 is slightly tilted, and correspond to FIGS. 7A and 7B, respectively.

Also in the case in which the retarder 64g is tilted in such a way that the optical axis thereof is tilted in a direction opposite to the direction of tilt of the optical axis of the liquid-crystalline compound 65, as shown in FIG. 7D, the influences of birefringence in the liquid crystal layer 61c and the retarder 64c are cancelled out, and the influences of birefringence in the liquid crystal layer 61e and the retarder 64g are cancelled out. As a result, as in the case in which the retarder 64g is tilted in such a way that the optical axis thereof is tilted in the same direction as the direction of tilt of the optical axis of the liquid-crystalline compound 65, it is possible to increase the contrast.

As is clear from the above description, in the reflective liquid crystal panels 61b, 61g, and 61r of this embodiment, the liquid crystal molecule (the liquid-crystalline compound 65) is oriented so as to be slightly tilted from a vertical state with respect to the substrate surface in a state in which no voltage is applied, and the retarders 64b, 64g, and 64r are retarders having retardation characteristics which compensate for the retardation characteristic of the reflective liquid crystal panels 61b, 61g, and 61r in a state in which no voltage is applied. Furthermore, when the indexes of refraction in the substrate surface are assumed to be nx and ny and the index of refraction in a thickness direction is assumed to be nz, the retarders 64b, 64g, and 64r are retarders which satisfy relational expression (4) below.

$$ny \approx nx > nz \quad (4)$$

Therefore, it is possible to choose to tilt the retarders 64b, 64g, and 64r in a direction in which the lights reflected from the surfaces of the retarders 64b, 64g, and 64r do not enter the projection system 80.

Figure 8:
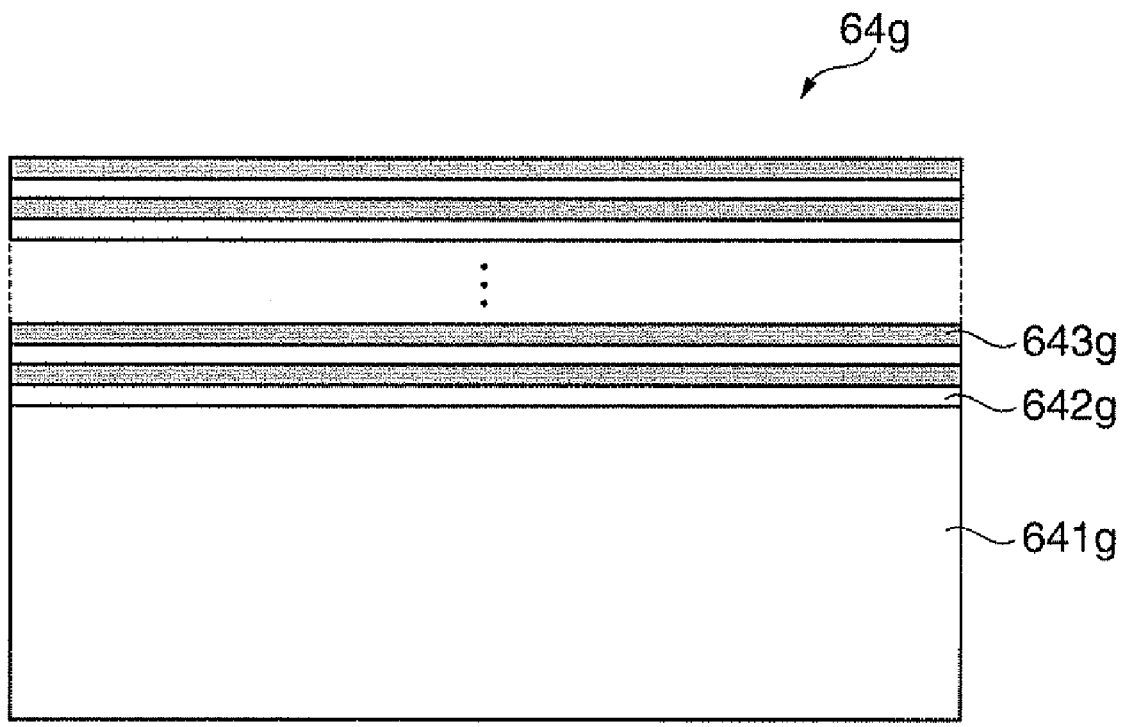
FIG. 8 is an enlarged view of a retarder for the G optical path forming the projector of FIG. 1.

Incidentally, FIG. 8 is an enlarged view of the retarder 64g of the projector 100 according to this embodiment. The retarder 64g has a structure in which inorganic films 642g with a thickness of less than or equal to a wavelength of light and inorganic films 643g with an index of refraction lower than that of the inorganic films 642g are laid one on top of another on at least one surface of a retarder substrate 641g.

With this retarder 64g, since inorganic substances can be used as all the constituents thereof, it is possible to increase the reliability of the liquid crystal light valve 60g reliably.

The entire disclosure of Japanese Patent Application No. 2010-110883, filed May 13, 2010 and Japanese Patent Application No. 2011-060474, filed Mar. 18, 2011 are expressly incorporated by reference herein.

What is claimed is:

1. A projector, comprising:
an illumination system emitting an illuminating light having a system optical axis as a central axis thereof;
a polarizing beam splitter allowing a light from the illumination system to pass therethrough and reflecting the light;
a reflective liquid crystal panel modulating, according to an image signal, the light which has passed through the polarizing beam splitter;
a retarder placed between, the reflective liquid crystal panel and the polarizing beam splitter; and
a projection system projecting the light reflected from the polarizing beam splitter,
wherein
the projection system has an optical axis which does not coincide with the system optical axis and is parallel to the system optical axis,
the polarizing beam splitter is placed in such a way that a normal direction of a substrate plane of the polarizing beam splitter and the system optical axis form an angle of about 45 degrees, and
the retarder is placed and tilted in a direction in which the following conditional expression is satisfied, denoting a point where the normal drawn from the center of a substrate plane of the retarder and the substrate plane of the polarizing beam splitter intersect as A, a point where the substrate plane of the polarizing beam splitter and the system optical axis intersect as B, a point where the substrate plane of the polarizing beam splitter and the optical axis of the projection system intersect as C, a distance between the point A and the point C as AC and a distance between the point B and the point C as BC:

$$AC > BC.$$

2. The projector according to claim 1, wherein
the retarder is placed and tilted so that the following conditional expression is satisfied, denoting an angle of tilt of a luminous flux incidence plane of the retarder with respect to a virtual plane (a yz-plane) perpendicular to the system optical axis as $\theta$, a radius of a lens of the projection system as d, a shift distance between the lens optical axis of the projection system and the system optical axis as s, a lens back focus of the projection system as L, a distance between the reflective liquid crystal panel and the retarder as f, and a F number of the lens of the projection system as Fno:

$(L-f)*\tan(2\theta) > d-s$ is satisfied.

3. The projector according to claim 1, wherein
the retarder has a retardation characteristic which compensates for the retardation characteristic of the reflective liquid crystal panel in a state in which no voltage is applied, and
the retarder satisfies the following conditional expression, denoting an indexes of refraction in a plane of the retarder as nx and ny and an index of refraction in a thickness direction of the retarder as nz:

$$ny \approx nx > nz.$$

4. The projector according to claim 1, wherein
the retarder is a structural birefringent retarder formed of multilayered inorganic substances.

* * * * *